F. D. MEADE.
COMBINED RECEPTACLE COVER AND INSECT TRAP.
APPLICATION FILED MAR. 15, 1916.
1,212,660.
Patented Jan. 16, 1917.
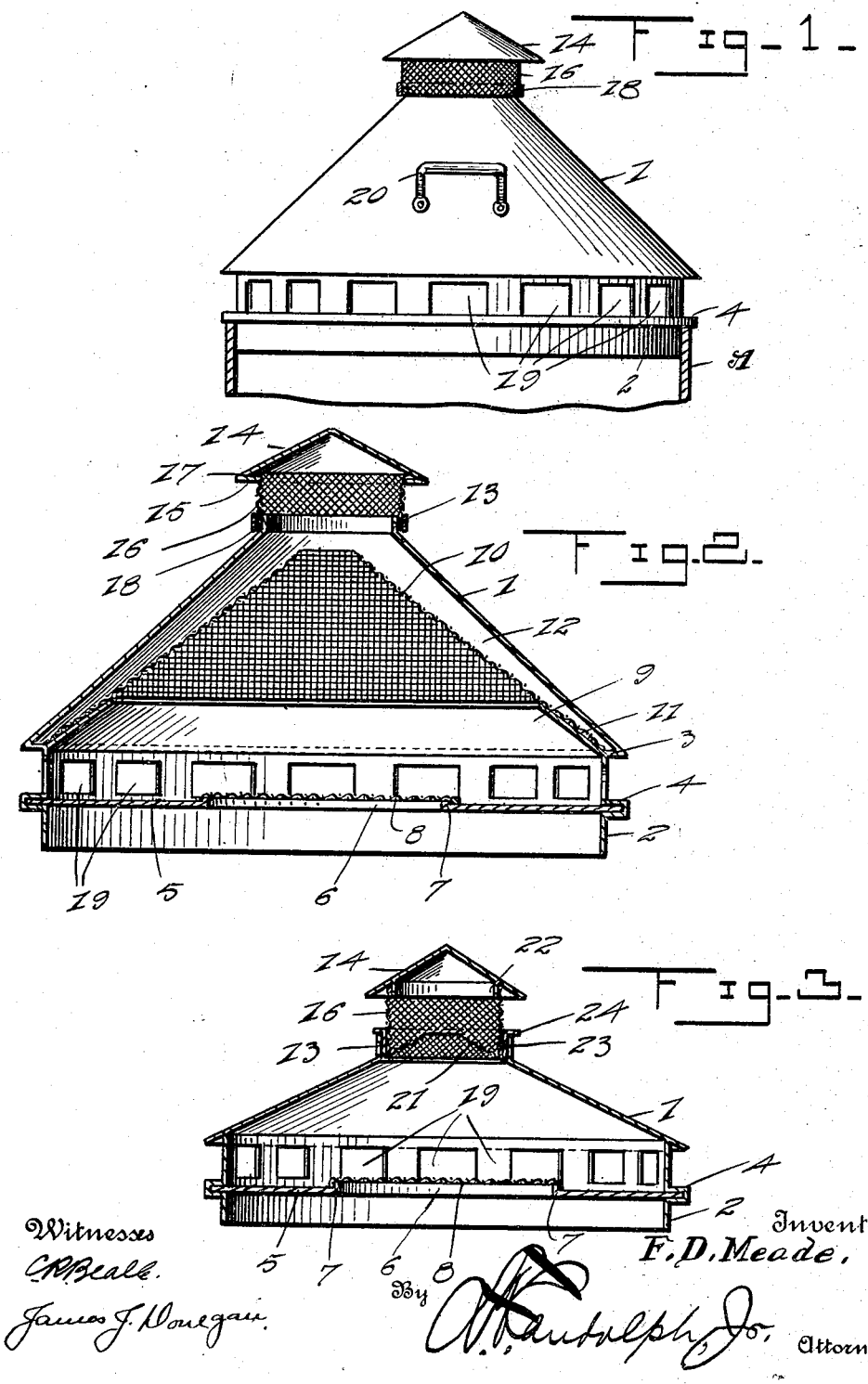

UNITED STATES PATENT OFFICE.

FRED D. MEADE, OF LAKE CHARLES, LOUISIANA.

COMBINED RECEPTACLE-COVER AND INSECT-TRAP.

1,212,660.  Specification of Letters Patent.  Patented Jan. 16, 1917.

Application filed March 15, 1916. Serial No. 84,401.

*To all whom it may concern:*

Be it known that I, FRED D. MEADE, a citizen of the United States, residing at Lake Charles, in the parish of Calcasieu and State of Louisiana, have invented certain new and useful Improvements in Combined Receptacle-Covers and Insect-Traps; and I do hereby declare the following to be a full, clear, and exact description of the invention, such as will enable others skilled in the art to which it appertains to make and use the same.

The object of this invention is to provide a combined cover and insect trap for garbage cans and like receptacles, which will be of simple and durable construction, cheap to manufacture and efficient in operation.

Other objects will appear and be better understood from that embodiment of my invention of which the following is a specification, reference being had to the accompanying drawing forming a part thereof, in which:

Figure 1 is a sectional detail view taken through the upper end of a receptacle and showing the improved cover applied thereto, Fig. 2 is a vertical sectional view taken through the cover, and Fig. 3 is a vertical sectional view taken through a modified form of cover.

Referring to the drawing in detail, the numeral 1 designates a hollow conical shaped body having the sides thereof depressed inwardly, at the lower end thereof, to provide the depending cylindrical shaped portion 2 and the annular connecting shoulder 3. The cylindrical portion 2 has the wall thereof depressed outwardly, at a medial point, to provide the annular rib 4, which is adapted to rest on the upper edge of the receptacle A, shown in Fig. 1, and hold the cover in proper position. Located within the depending cylindrical portion 2 is a disk 5, the periphery of which extends into the interior of the rib 4 and is secured thereto in any suitable manner. The disk 5 is centrally provided with an opening 6, the walls of which are extended upwardly above the plane of the disk 5 and formed to provide an annular shoulder 7. A circular piece of foraminous material, designated 8, overlies the opening 6 in the disk 5 and has its peripheral edge engaging over the annular shoulder 7 and secured in place in any suitable manner.

Secured within the body 1 is a hollow frusto conical shaped body 9 and superimposed on the body 9 is a conical shaped body 10, formed of foraminous material, and has its base portion thereof engaged over and secured to the frusto conical shaped body 9. The apex end of the body 10 is open, and the bodies 9 and 10 are arranged in spaced relation with the inner surface of the body 1, as shown in Fig. 2, so as to provide a trapping chamber 12. The upper end of the body 1 is open, and the upper end of the wall of the body 1 is formed to provide an annular shoulder 13.

Positioned above the annular collar 13 is a conical shaped top piece 14, comprising a hollow conical shaped body the face of which is bent inwardly, as shown at 15, and a depending cylindrical body 16, formed of foraminous material and having its upper end flanged to engage over the inwardly bent portion 16 on the conical shaped body, the lower end of the cylindrical body 16 having a ring 18 secured thereto for detachably engaging over the collar 13 on the upper end of the body 1, so as to secure the top piece in position.

The cylindrical shaped portion 2 at the lower end of the body 1 is provided with a series of openings 19, which are located above the rib 4 and provide entrances through which the insects can gain access to the interior of the foraminous body 10, and thence through the open end of the body 10 to the trapping chamber 12. When it is desired to kill the imprisoned insects, the cover as a whole can be immersed in a receptacle containing a liquid, the liquid finding its way through the foraminous piece of material 8 and through the cylindrical body 16 into the interior of the entrapping chamber and in contact with the imprisoned insects.

In the modification shown in Fig. 3, instead of the conical shaped body 10 being employed, a smaller body, shown at 21, is located within the cylindrical body 16 and the upper end of the cylindrical body 16 is fitted over a depending annular collar 22 formed on the inner surface of the conical shaped body portion of the top piece 1, adjacent the lower end thereof, and the lower end of the cylindrical body 16 has connection with an annular ring 23, which removably fits within the collar 13 and the body 1 and has its upper edge provided with a flange 24 which engages over the upper edge of the collar 13 and limits the inward movement of the cylindrical body portion of the top piece.

Having thus described my invention what is claimed is:

1. A device of the class described comprising a hollow body adapted to engage over the open end of a receptacle and having its upper end open and its lower end provided with a depending cylindrical portion, the said depending cylindrical portion having a plurality of openings therein and having an outwardly depressed annular rib formed therein and located below the openings, a disk positioned within the cylindrical portion and having its peripheral edge extending into the interior of the rib, the said disk having a central opening therein, a piece of foraminous material covering the opening in the disk, a body positioned within the first-mentioned body and located above the disk and formed of foraminous material and having its opposite ends open, and a removable top piece closing the upper end of the first-mentioned body.

2. A device of the class described comprising a hollow conical shaped body having a depending hollow cylindrical portion carried by the lower end thereof and disposed inwardly of the lower end of the conical body and provided with a plurality of openings located adjacent the upper end thereof, the said hollow portion having an annular rib bent outwardly therefrom at a point below the openings and adapted to rest on the upper edge of a receptacle, the said hollow conical body having a trapping chamber communicating with the interior thereof and located above the cylindrical portion, a disk positioned within the cylindrical portion and having its peripheral edge received by the interior of the annular rib, the said disk being adapted to overlie the exterior of the receptacle and having a central opening therein, and a piece of foraminous material overlying the opening in the disk.

3. A device of the class described comprising a hollow conical shaped body having its lower end provided with an internal annular shoulder, and a cylindrical portion depending from the inner edge of the annular shoulder and provided with a plurality of openings, a frusto conical shaped body located within the first-mentioned body and in spaced relation thereto and having its lower end integrally secured to the point of juncture between the annular shoulder and the depending cylindrical portion, and a hollow conical shaped body fitted within the first-mentioned hollow conical body and in spaced relation thereto and formed of foraminous material and having its lower end fitting over the upper end of the frusto conical shaped body.

In testimony whereof I affix my signature in presence of two witnesses.

FRED D. MEADE.

Witnesses:
B. J. THOMPSON,
H. E. MEADE.

Copies of this patent may be obtained for five cents each, by addressing the "Commissioner of Patents, Washington, D. C."